United States Patent
Kitazume

(10) Patent No.: US 11,472,479 B2
(45) Date of Patent: Oct. 18, 2022

(54) HANDS-OFF DETECTION DEVICE AND STEERING DEVICE

(71) Applicant: NSK LTD., Tokyo (JP)

(72) Inventor: Tetsuya Kitazume, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/442,431

(22) PCT Filed: Mar. 15, 2021

(86) PCT No.: PCT/JP2021/010418
§ 371 (c)(1),
(2) Date: Sep. 23, 2021

(87) PCT Pub. No.: WO2022/014097
PCT Pub. Date: Jan. 20, 2022

(65) Prior Publication Data
US 2022/0126913 A1  Apr. 28, 2022

(30) Foreign Application Priority Data

Jul. 13, 2020 (JP) .............................. JP2020-120037

(51) Int. Cl.
*B62D 5/04* (2006.01)
*B62D 5/00* (2006.01)
(Continued)

(52) U.S. Cl.
CPC .............. *B62D 6/10* (2013.01); *B62D 5/046* (2013.01); *B62D 15/021* (2013.01)

(58) Field of Classification Search
None
See application file for complete search history.

(56) References Cited

U.S. PATENT DOCUMENTS 7,912,665 B2 * 3/2011 Deng ..................... B60K 28/06
702/109
2010/0131233 A1 5/2010 Deng et al.
(Continued)

FOREIGN PATENT DOCUMENTS

JP 6590090 B2 10/2019
JP 2020-001531 A 1/2020
(Continued)

OTHER PUBLICATIONS

International Search Report of PCT/JP2021/010418 dated May 18, 2021 [PCT/ISA/210].
(Continued)

*Primary Examiner* — Adam D Tissot
*Assistant Examiner* — Laura E Linhardt
(74) *Attorney, Agent, or Firm* — Sughrue Mion, PLLC

(57) ABSTRACT

A hands-off detection device includes: a first steering angle acquisition unit configured to acquire a first steering angle of a steering wheel; a second steering angle acquisition unit configured to acquire a second steering angle of a steering mechanism connected to the steering wheel via a torsion bar; a steering angle estimation unit configured to obtain an estimation angle of the first steering angle in a state where the steering wheel is not being grasped on a basis of the second steering angle; and a grasping state determination unit configured to determine a grasping state of the steering wheel on a basis of the frequency component of a angle difference between the first steering angle and the estimation angle and a reference frequency component being the frequency component of the angle difference in the state where the steering wheel is not being grasped.

6 Claims, 9 Drawing Sheets

(51) Int. Cl.
    *B62D 6/10*     (2006.01)
    *B62D 15/02*     (2006.01)
    *G01L 5/22*     (2006.01)

(56) References Cited

U.S. PATENT DOCUMENTS

| | | |
|---|---|---|
| 2011/0098890 A1 | 4/2011 | Lee et al. |
| 2013/0158771 A1 | 6/2013 | Kaufmann |
| 2013/0317699 A1 | 11/2013 | Urhahne |
| 2017/0029021 A1* | 2/2017 | Lee ...................... G05D 1/0088 |
| 2019/0009816 A1* | 1/2019 | Moreillon ............... B62D 1/286 |
| 2019/0382048 A1 | 12/2019 | Sawada et al. |
| 2020/0017141 A1 | 1/2020 | Moreillon et al. |
| 2020/0391790 A1* | 12/2020 | Kamemura .......... B62D 5/0463 |

FOREIGN PATENT DOCUMENTS

| | | |
|---|---|---|
| JP | 2020-006806 A | 1/2020 |
| JP | 2020-006844 A | 1/2020 |

OTHER PUBLICATIONS

Written Opinion of PCT/JP2021/010418 dated May 18, 2021 [PCT/ISA/237].
Supplementary European Search Report dated Apr. 13, 2022 from the European Patent Office in EP Application No. 21766098.4.
Office Action dated May 6, 2022 from the European Patent Office in EP Application No. 21766098.4.

\* cited by examiner

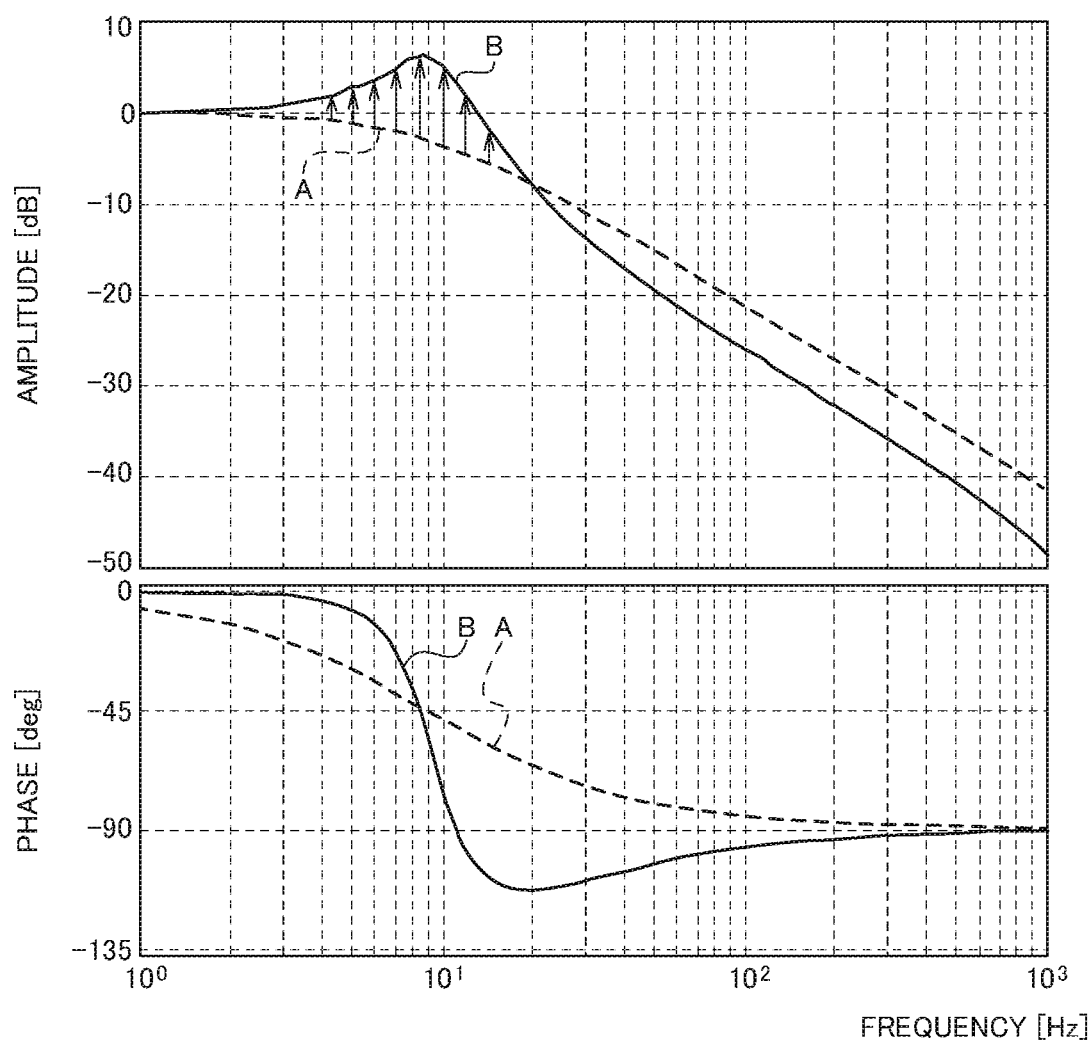

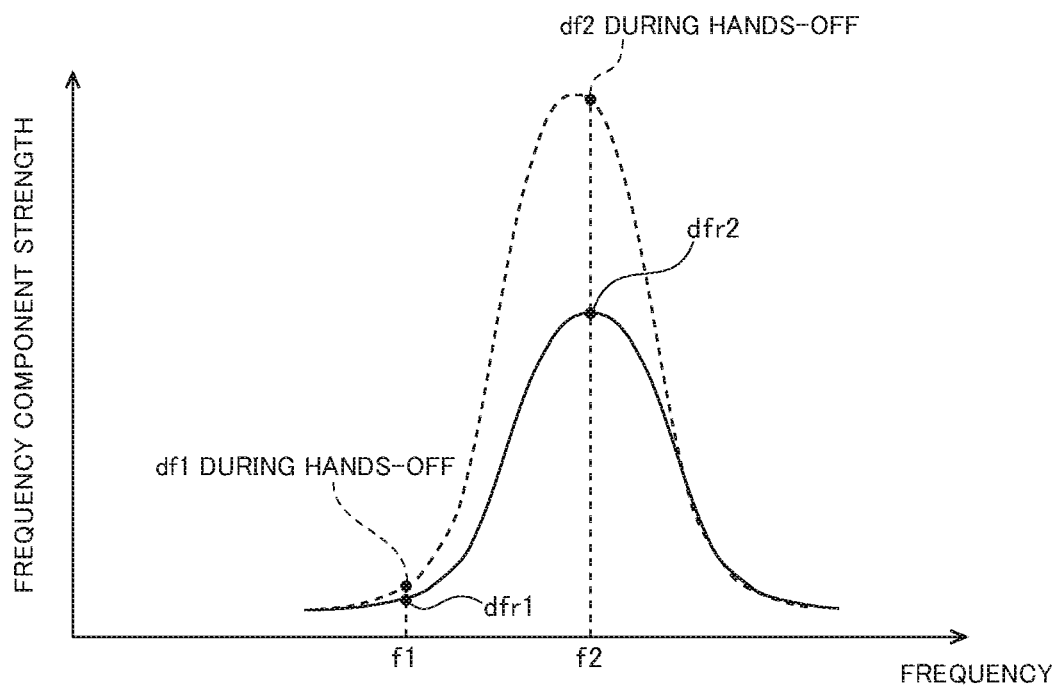

HANDS-OFF DETECTION DEVICE AND STEERING DEVICE

CROSS REFERENCE TO RELATED APPLICATIONS

This application is a National Stage of International Application No. PCT/JP2021/010418 filed on Mar. 15, 2021, claiming priority based on Japanese Patent Application No. 2020-120037 filed on Jul. 13, 2020.

TECHNICAL FIELD

The present invention relates to a hands-off detection device and a steering device.

BACKGROUND ART

Recent years have seen use of hands-off detection technologies for detecting whether a driver is grasping the steering wheel (a hands-on state) or not grasping the steering wheel (a hands-off state) in the technological field of automated driving technology, driver assistance technology, and the like for vehicles.

For example, an advanced driver assistance system (ADAS) for assisting vehicle driving operation by a driver detects whether the driver is in the hands-on state or not, and determines whether to continue execution of the ADAS function.

PTL 1 below describes an electric power steering device that determines hands-on when a time during which a deviation angle between an estimated steering wheel angle in a hands-free state estimated from an output-side angle of a column shaft and an actual steering wheel angle is equal to or more than a predetermined angle continues.

CITATION LIST

Patent Literature

PTL1: JP 6590090 B

SUMMARY OF INVENTION

Technical Problem

However, it is difficult to increase detection accuracy when determining whether the driver is in the hands-on state or not on the basis of the magnitude of a difference between the estimated steering wheel angle in the hands-free state and the actual steering wheel angle, as in PTL 1 above.

The present invention has been conceived in light of the above circumstances, and it is an object of the present invention to improve detection accuracy when detecting the hands-on state where a steering wheel is being grasped and the hands-off state where the steering wheel is not being grasped.

Solution to Problem

In order to achieve the above-described object, according to an aspect of the present invention, there is provided a hands-off detection device including: a first steering angle acquisition unit configured to acquire a first steering angle being a steering angle of a steering wheel; a second steering angle acquisition unit configured to acquire a second steering angle being a steering angle of a steering mechanism connected to the steering wheel via a torsion bar; a steering angle estimation unit configured to obtain an estimation angle of the first steering angle in a state where the steering wheel is not being grasped on a basis of the second steering angle acquired by the second steering angle acquisition unit; a difference calculation unit configured to calculate an angle difference between the first steering angle acquired by the first steering angle acquisition unit and the estimation angle; a frequency analysis unit configured to calculate a frequency component of the angle difference; a storage unit configured to store a reference frequency component being the frequency component of the angle difference in the state where the steering wheel is not being grasped; and a grasping state determination unit configured to determine a grasping state of the steering wheel on a basis of the frequency component calculated by the frequency analysis unit and the reference frequency component.

According to another aspect of the present invention, there is provided a steering device including the hands-off detection device described above, the steering device applying steering force to the steering mechanism according to a result of the determination of the grasping state of the steering wheel by the hands-off detection device.

Advantageous Effects of Invention

According to the present invention, it is possible to improve detection accuracy when detecting the hands-on state where a steering wheel is being grasped and the hands-off state where the steering wheel is not being grasped.

BRIEF DESCRIPTION OF DRAWINGS

FIG. 4 illustrates a Bode diagram of one example of response characteristics of a first steering angle with respect to a second steering angle, which are used for estimation of the first steering angle;

FIG. 9 is a schematic diagram of a second example of the frequency component of the angle difference and the reference frequency component in the hands-off state.

DESCRIPTION OF EMBODIMENTS

Embodiments of the present invention will be described in detail with reference to the drawings. Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

First Embodiment (Configuration)

Figure 1:
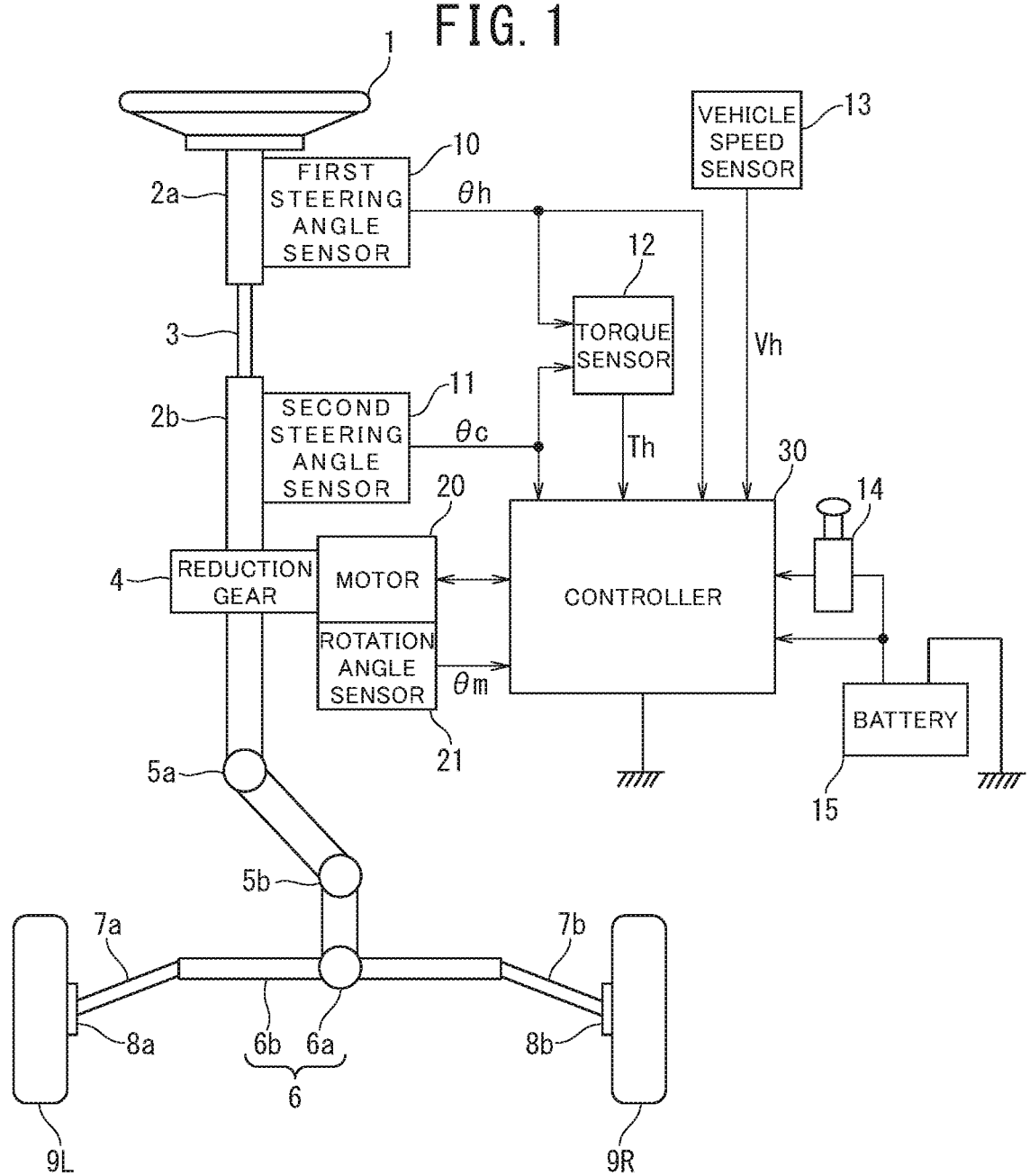
FIG. 1 is a configuration diagram illustrating an overview of one example of an electric power steering device of an embodiment.

FIG. 1 is a configuration diagram illustrating an overview of one example of an electric power steering device. A steering shaft (a steering shaft, a handle shaft, and a column shaft) connected to a steering handle (steering wheel) 1 includes an input-side steering shaft 2a on a steering handle side and an output-side steering shaft 2b on a steered wheel side. The input-side steering shaft 2a and the output-side steering shaft 2b are connected to each other via a torsion bar 3.

The output-side steering shaft 2b is connected to steered wheels 9L and 9R through a reduction gear (worm gear) 4 forming a reduction mechanism, universal joints 5a and 5b, a pinion rack mechanism 6, tie rods 7a and 7b, and then hub units 8a and 8b.

The pinion rack mechanism 6 includes a pinion 6a connected to a pinion shaft to which steering force is transmitted from the universal joint 5b and a rack 6b meshing with the pinion 6a, and converts a rotary motion transmitted to the pinion 6a into a linear motion in a vehicle width direction by the rack 6b.

The input-side steering shaft 2a is provided with a first steering angle sensor 10 that detects a first steering angle θh being a rotation angle of the input-side steering shaft 2a, and the output-side steering shaft 2b is provided with a second steering angle sensor 11 that detects a second steering angle θc being a rotation angle of the output-side steering shaft 2b. The first steering angle sensor 10 and the second steering angle sensor 11 are one example of a "first steering angle acquisition unit" and a "second steering angle acquisition unit", respectively, described in the claims.

For example, the first steering angle sensor 10 may be a rotor sensor that outputs an angle signal with a 20 [deg] cycle that goes around one cycle every time the first steering angle θh changes by 20 [deg], and the second steering angle sensor 11 may be a rotor sensor that outputs an angle signal with a 40 [deg] cycle that goes around one cycle every time the second steering angle θc changes by 40 [deg].

The first steering angle θh and the second steering angle θc can be acquired by subjecting the angle signals having a saw-tooth waveform output from the first steering angle sensor 10 and the second steering angle sensor 11, respectively, to anti-rollover processing (waveform processing for converting the angle signals to continuous angle signals).

Torque sensor 12 detects a steering torque Th applied to the steering handle 1. For example, the torque sensor 12 calculates a difference between the first steering angle θh and the second steering angle θc as a torsion angle θd, and multiplies the torsion angle θd by a spring constant Kh of the torsion bar 3 to calculate the steering torque Th on the basis of the following equation (1):

$$Th = Kh \times \theta d = Kh \times (\theta h - \theta c) \tag{1}$$

The output-side steering shaft 2b is connected to a motor 20 that assists the steering force of the steering handle 1 via the reduction gear 4. The motor 20 is provided with a rotation angle sensor 21 that detects a rotation angle θm of the motor 20. The rotation angle sensor 21 inputs the detected rotation angle θm of the motor 20 to a controller 30.

The controller 30 is an electronic control unit (ECU) that controls the electric power steering (EPS) device. Note that the controller 30 is one example of a "hands-off detection device" described in the claims.

Electric power is supplied to the controller 30 from a battery 15, and an ignition key signal is input to the controller 30 via an ignition (IGN) key 14.

The controller 30 calculates a current command value of an assist control command on the basis of the steering torque Th detected by the torque sensor 12 and a vehicle speed Vh detected by a vehicle speed sensor 13, and controls a current supplied to the motor 20 by means of a voltage control command value obtained by subjecting the current command value to compensation or the like.

Additionally, on the basis of the first steering angle θh and the second steering angle θc, the controller 30 determines whether the grasping state of the steering handle 1 is a hands-on state or a hands-off state. The controller 30 controls the steering force generated by the motor 20 according to a result of the determination of the grasping state.

For example, when the grasping state of the steering handle 1 is the hands-on state, the controller 30 may perform corrective steering (such as correction of lane departure or correction of a sudden change in lateral force), and may stop the above corrective steering when the hands-off state continues.

The controller 30 may include, for example, a computer formed by a processor and peripheral components such as a storage device. The processor may be, for example, a central processing unit (CPU) or a micro-processing unit (MPU).

The storage device may include any of a semiconductor storage device, a magnetic storage device, and an optical storage device. The storage device may include memories, such as register, cache memory, and read only memory (ROM) and random access memory (RAM) used as primary storage devices.

Functions of the controller 30 that will be described below are achieved by, for example, allowing the processor of the controller 30 to execute a computer program stored in the storage device.

Note that the controller 30 may include dedicated hardware for executing each information processing that will be described below.

For example, the controller 30 may include a functional logic circuit set in a general-purpose semiconductor integrated circuit. For example, the controller 30 may include a programmable logic device (PLD) such as a field-programmable gate array (FPGA), or the like.

Figure 2:
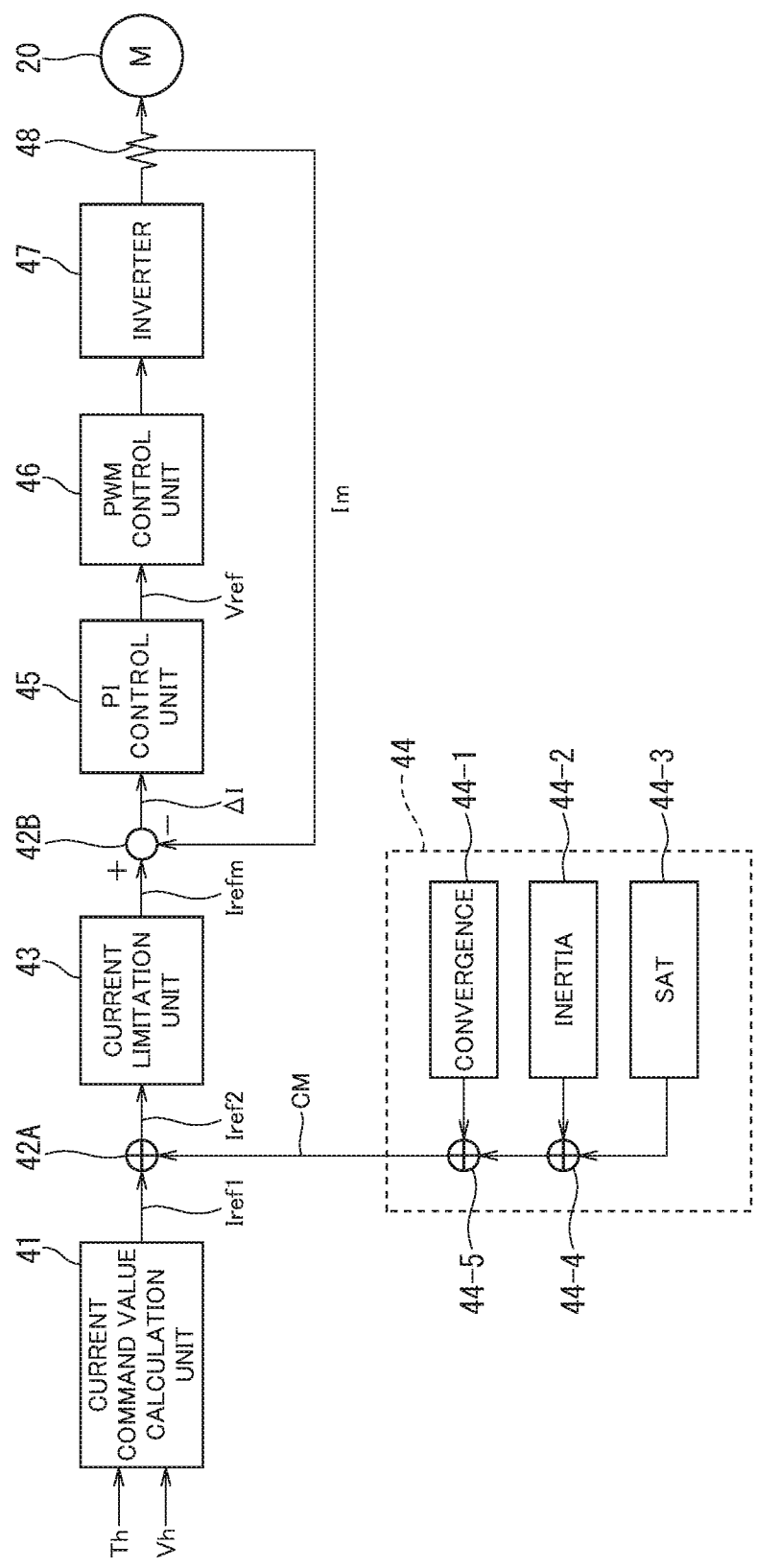
FIG. 2 is a block diagram illustrating one example of a functional configuration of a steering assist function by a controller depicted in FIG. 1.

Next, one example of a functional configuration of a steering assist function by the controller 30 will be described with reference to FIG. 2.

The steering torque Th and the vehicle speed Vh are input to a current command value calculation unit 41 that calculates a current command value Iref1. On the basis of the steering torque Th and the vehicle speed Vh input, the current command value calculation unit 41 calculates the current command value Iref1, which is a control target value of the current supplied to the motor 20, by using an assist map or the like.

The current command value Iref1 is input to a current limitation unit 43 via an adder 42A, and a current command value Irefm with a limited maximum current is input to a subtractor 42B. A deviation ΔI (=Irefm−Im) between the current command value Irefm and a fed-back motor current value Im is calculated, and the deviation ΔI is input to a PI (proportional-integral) control unit 45 for improving characteristics of steering operation. A voltage control command value Vref whose characteristics have been improved by the PI control unit 45 is input to a PWM control unit 46, and then, the motor 20 is PWM driven via an inverter 47 serving as a driver unit. The current value Im of the motor 20 is detected by a motor current detector 48 and fed back to the subtractor 42B.

The adder 42A is added with a compensation signal CM from a compensation signal generation unit 44, and characteristic compensation of a steering system is performed by the addition of the compensation signal CM to improve characteristics such as convergence and inertia. The compensation signal generation unit 44 adds a self-aligning torque (SAT) 44-3 and an inertia 44-2 by an adder 44-4, furthermore adds a convergence 44-1 to a result of the addition by an adder 44-5, and uses a result of the addition by the adder 44-5 as the compensation signal CM.

Next, one example of a functional configuration of a hands-off detection function by the controller 30 will be described with reference to FIG. 3.

The controller 30 includes a steering angle estimation unit 50, a subtractor 51, a frequency analysis unit 52, a reference value storage unit 53, and a grasping state determination unit 54. Note that the subtractor 51 and the reference value storage unit 53 are one example of a "difference calculation unit" and a "storage unit" respectively described in the claims.

On the basis of the second steering angle θc on the steered wheel side detected by the second steering angle sensor 11, the steering angle estimation unit 50 estimates an estimation angle θhe of the first steering angle θh on the steering handle side (i.e., a steering angle of the steering handle 1) in a state where the steering handle 1 is not being grasped.

For example, frequency response characteristics of the first steering angle θh with respect to the second steering angle θc in the state where the steering handle 1 is not being grasped are set in advance by experiment, simulation, or a theoretical formula. The steering angle estimation unit 50 may estimate the estimation angle θhe by inputting the second steering angle θc detected by the second steering angle sensor 11 to a filter having the frequency response characteristics set in advance as described above.

For example, there may be used a resonance filter having the frequency response characteristics of the first steering angle θh with respect to the second steering angle θc in the state where the steering handle 1 is not being grasped.

For example, the resonance filter may be designed on the basis of the first and second steering angles θh and θc measured when rotating the steering shaft from the output-side steering shaft 2b to reproduce resonance of the steering handle 1 in the state where the steering handle 1 is not being grasped.

Specifically, in a real machine, a bench test system, or the like that mimics the real machine, after energizing an ECU, the output-side steering shaft 2b may be rotated by manual input in a hands-free state where the steering handle is not being touched at all (or with the universal joint 5a in FIG. 1 being separated), and the first and second steering angles θh and θc at that time may be measured. Then, on the basis of a result of the measurement, a frequency response of the first steering angle θh with respect to the second steering angle θc may be obtained, and the resonance filter may be designed so as to have the same characteristics as the obtained frequency response.

Note that the first steering angle θh includes the resonance of the steering handle 1. Accordingly, the resonance filter may include a second-order filter to estimate the estimation angle θhe that mimics the first steering angle θh in the hands-free state.

FIG. 4 illustrates an example of the frequency characteristics of a resonance filter designed according to the characteristics of real machine data measured in the above manner.

FIG. 4 is a Bode diagram illustrating a characteristic example of the resonance filter representing the frequency response characteristics of the first steering angle θh with respect to the second steering angle θc. Characteristics B indicated by a solid line illustrate characteristics of the resonance filter, and characteristics A indicated by a dashed line illustrate characteristics of a typical second-order LPF.

A gain of the resonance filter is flat to around 3 Hz, then convexly larger than that of the typical second-order LPF around 10 Hz, and is slightly lower than that of the typical second-order LPF at approximately 20 Hz or higher. Additionally, a phase of the resonance filter is less delayed than that of the typical second-order LPF at approximately 8 Hz or lower, and more delayed than that of the typical second-order LPF at approximately 8 Hz or higher.

Figure 3:
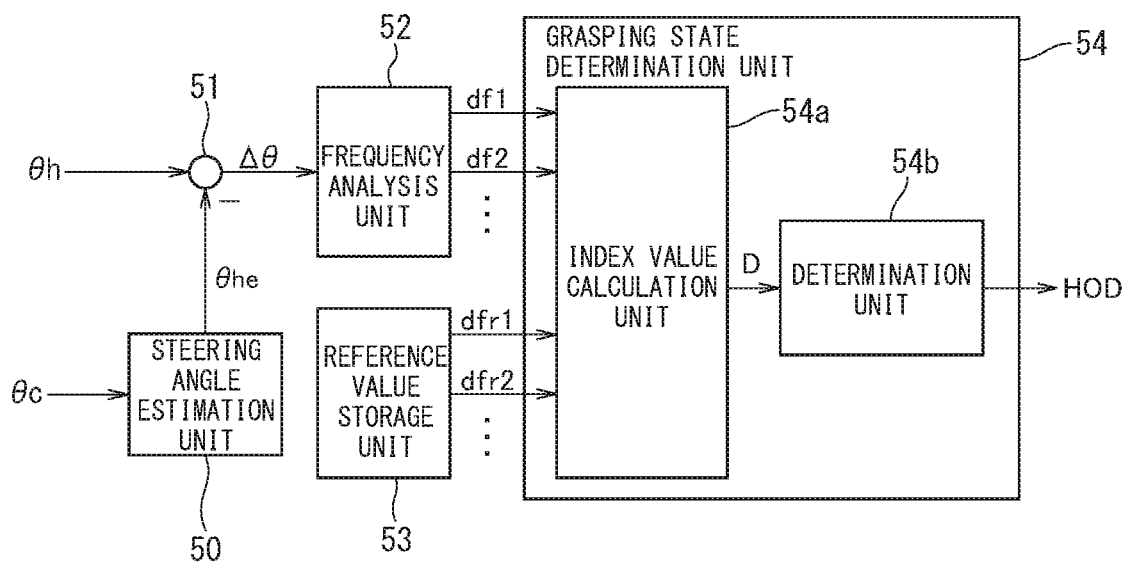
FIG. 3 is a block diagram illustrating one example of a functional configuration of a hands-off detection function by the controller depicted in FIG. 1.

Reference will be made to FIG. 3. The subtractor 51 calculates, as the angle difference Δθ, a difference (θh−θhe) obtained by subtracting the estimation angle θhe of the first steering angle θh estimated by the steering angle estimation unit 50 from the first steering angle θh detected by the first steering angle sensor 10.

Note that the configuration for acquiring the first steering angle θh and the second steering angle θc used for calculation of the angle difference Δθ is not limited to the above configuration. Various configurations can be used as long as actual values of the first and second steering angles θh and θc can be measured.

Figure 5A:
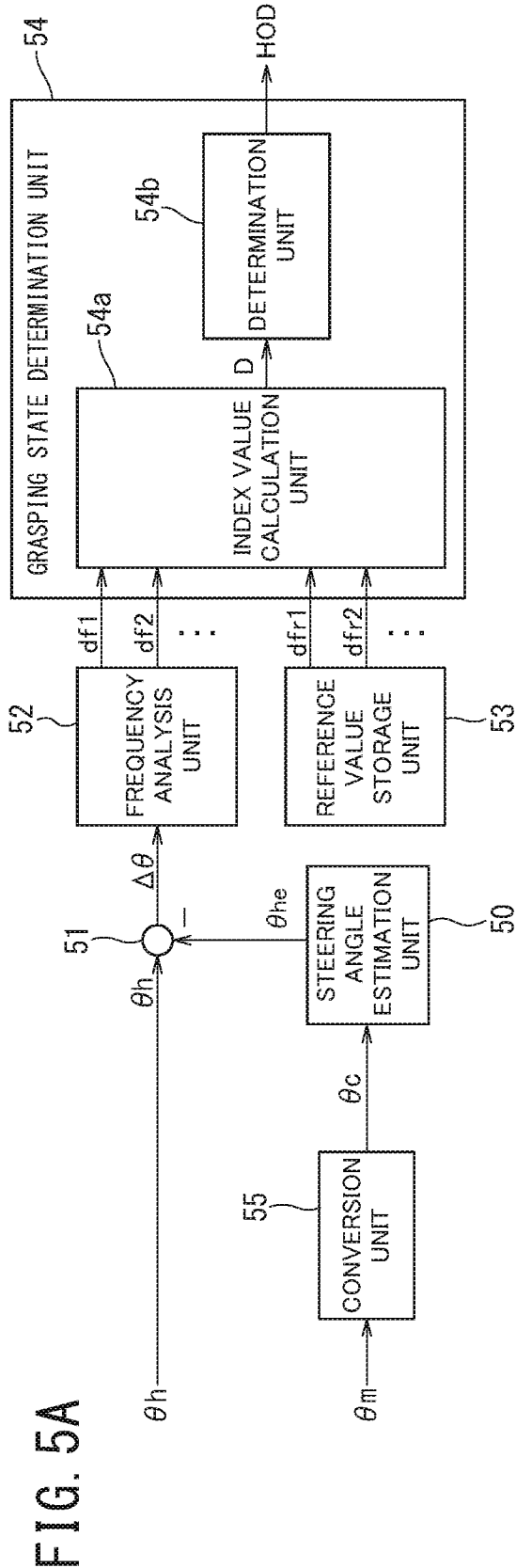
FIGS. 5A and 5B are block diagrams illustrating modifications of the functional configuration of FIG. 3.

For example, as illustrated in FIG. 5A, the second steering angle θc may be acquired from the rotation angle θm of the motor 20 detected by the rotation angle sensor 21 of the motor 20 instead of the second steering angle sensor 11.

A conversion unit 55 converts the rotation angle θm to the second steering angle θc on the basis of the following equation (2):

$$\theta c = \theta m / (\text{number of pole pairs of motor}) / (\text{reduction ratio of reduction gear 4}) \quad (2)$$

In this case, the rotation angle sensor 21 and the conversion unit 55 are one example of a "second steering angle acquisition unit" described in the claims.

Figure 5B:
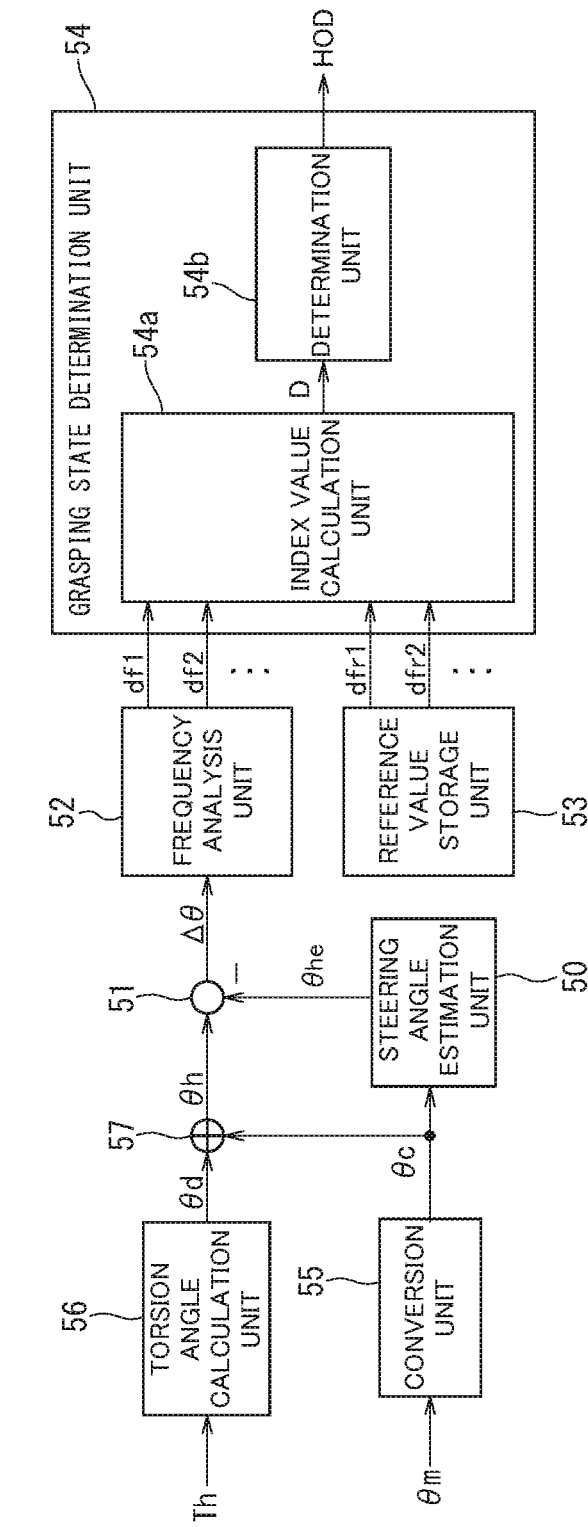

Additionally, for example, as illustrated in FIG. 5B, the first steering angle θh may be acquired from the steering torque Th applied to the steering handle 1 and the rotation angle θm of the motor 20.

A torsion angle calculation unit 56 calculates a torsion angle θd=Th/Kh, which is a difference (θh−θc) between the first steering angle θh and the second steering angle θc, on the basis of the steering torque Th.

An adder 57 adds the second steering angle θc to the torsion angle θd to calculate the first steering angle θh.

In this case, the torque sensor 12, the rotation angle sensor 21, the conversion unit 55, the torsion angle calculation unit 56 and the adder 57 are one example of a "first steering angle acquisition unit" described in the claims.

With the configuration of FIG. 5B, the first steering sensor 10 and the second steering sensor 11 can be omitted by using a torque sensor that does not require the detection of the first and second steering angles θh and θc (for example, a sensor that detects a magnetic flux according to the amount of torsion (torque) of the torsion bar 3).

Reference will be made to FIG. 3. The frequency analysis unit 52 performs frequency analysis of the angle difference Δθ calculated by the subtractor 51 to calculate a frequency component of the angle difference Δθ.

For example, the frequency analysis unit 52 performs frequency analysis at a predetermined frequency fi (i=1, 2, ... ) set in advance to calculate a frequency component dfi (i=1, 2, ... ) at the frequency fi. The frequency fi at which the frequency analysis is performed may be set to, for example, a frequency band where characteristics of the angle difference Δθ in a hands-off state are noticeable. The number of frequencies at subjected to the frequency analysis is not limited to two, and may be one or in plurality, three or more.

The reference value storage unit 53 stores a reference frequency component dfri (i=1, 2, ... ), which is a frequency component at the frequency fi (i=1, 2, ... ) of the angle difference Δθ in the state where the steering handle 1 is not being grasped. For example, the reference frequency component dfri (i=1, 2, ... ) is acquired in advance on the basis of a vehicle test, a bench evaluation, or a simulation result, and stored by the reference value storage unit 53.

The grasping state determination unit 54 determines whether the grasping state of the steering handle 1 is a hands-on state or a hands-off state on the basis of the frequency component dfi (i=1, 2, ... ) calculated by the frequency analysis unit 52 and the reference frequency component dfri (i=1, 2, ... ).

Next, an overview of a method for determining the grasping state according to an embodiment will be described with reference to FIGS. 6A to 6C.

A dashed line schematically illustrates the frequency component dfi of the angle difference Δθ in a hands-off state, a single-dotted line schematically illustrates the frequency component dfi of the angle difference Δθ in a hands-on state, and a solid line schematically illustrates the reference frequency component dfri.

Figure 6A:
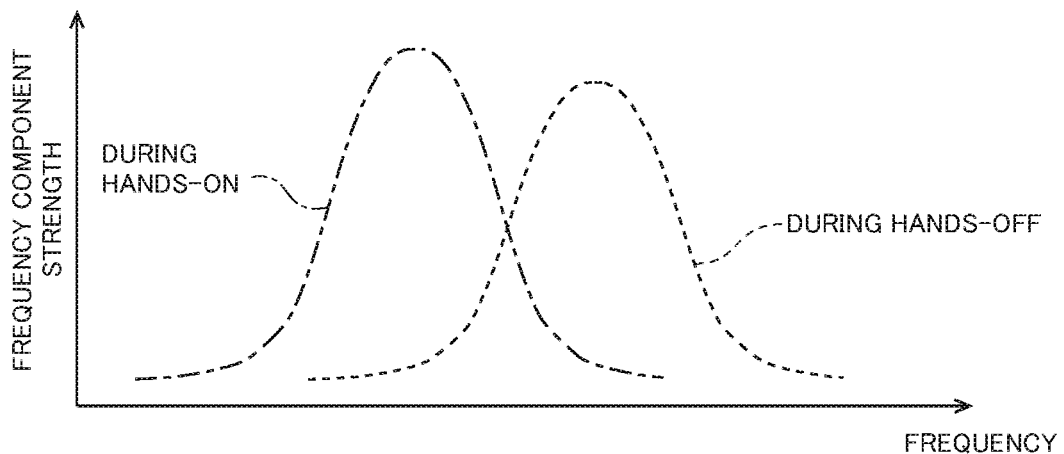
FIG. 6A is a schematic diagram of a frequency component of an angle difference between a detection value and an estimation value of the first steering angle.

As illustrated in FIG. 6A, frequency characteristics of the angle difference Δθ are significantly different between the hands-off state and the hands-on state. Therefore, the hands-off state and the hands-on state can be clearly distinguished by comparing the frequency component dfi calculated by the frequency analysis unit 52 with the reference frequency component dfri.

Figure 6B:
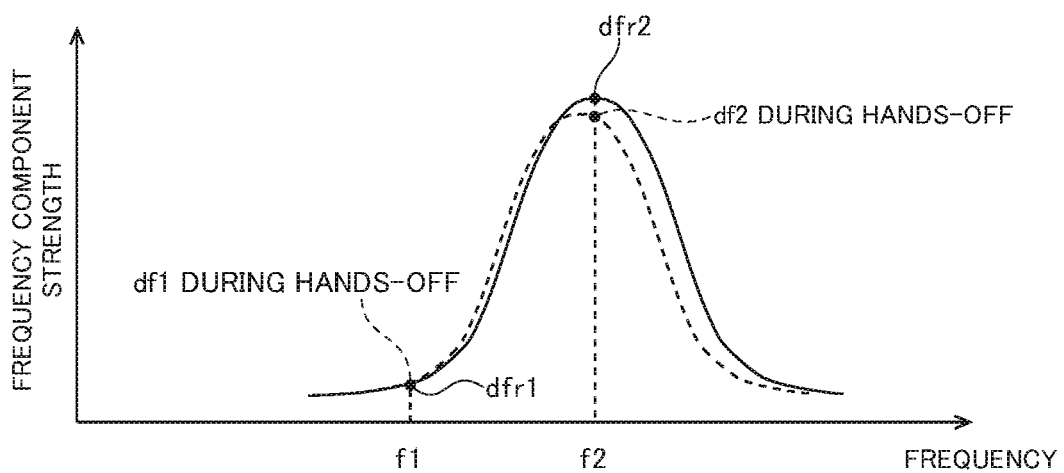
FIG. 6B is a schematic diagram of a first example of the frequency component of the angle difference and a reference frequency component in a hands-off state.

For example, when in the hands-off state, as illustrated in FIG. 6B, differences between the frequency component dfi (df1 and df2 in the example of FIG. 6B) calculated by the frequency analysis unit 52 and the reference frequency component dfri (dfr1 and dfr2 in the example of FIG. 6B) are each small.

Figure 6C:
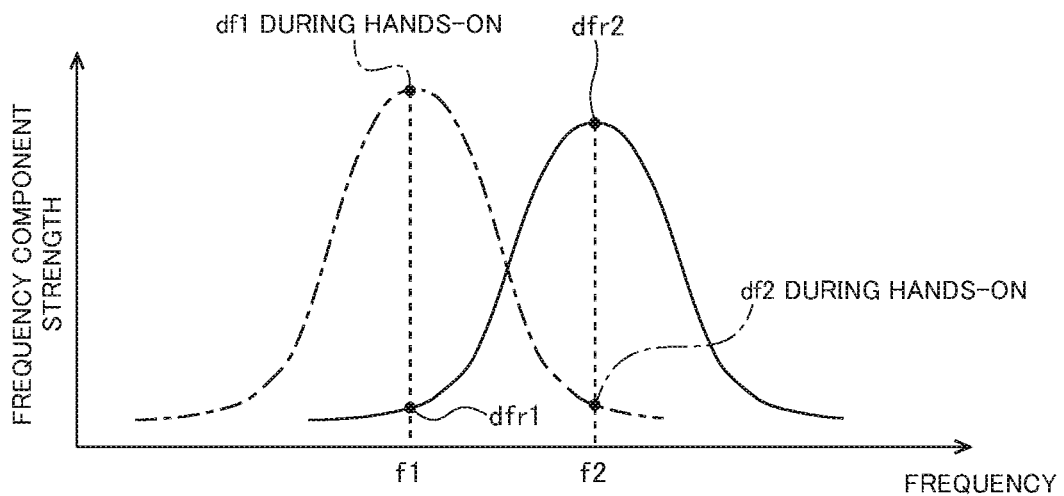
FIG. 6C is a schematic diagram of the frequency component of the angle difference in a hands-on state and the reference frequency component.

By contrast, when in the hands-on state, as illustrated in FIG. 6C, differences between the frequency component dfi (df1 and df2 in the example of FIG. 6C) and the reference frequency component dfri (dfr1 and dfr2 in the example of FIG. 6C) are each large.

Accordingly, the grasping state of the steering handle 1 can be determined with high accuracy on the basis of the difference between the frequency component dfi and the reference frequency component dfri.

Reference will be made to FIG. 3. The grasping state determination unit 54 includes an index value calculation unit 54a and a determination unit 54b.

The index value calculation unit 54a calculates an index value D based on a frequency component difference (dfi−dfri), which is a difference between the frequency component dfi and the reference frequency component dfri at each frequency fi (i=1, 2, ... ).

For example, the index value calculation unit 54a may calculate the index value D on the basis of a squared value (dfi−dfri)² of the frequency component difference (dfi−dfri). Additionally, the index value calculation unit 54a may calculate the index value D on the basis of an absolute value |dfi−dfri| of the frequency component difference (dfi−dfri).

In addition, for example, the index value calculation unit 54a may calculate, as the index value D, a weighted sum of the squared value (dfi−dfri)² or absolute value |dfi−dfri| of the frequency component difference at each frequency fi (i=1, 2, ... ).

For example, when the frequency components df1 and df2 at two frequencies f1 and f2 are each calculated, the index value calculation unit 54a may calculate, as the index value D, a weighted sum of, for example, the following equation (3), (4), (5), or (6).

$$D = R1 \times (df1 - dfr1)^2 + R2 \times (df2 - dfr2)^2 \quad (3)$$

$$D = R1 \times |df1 - dfr1| + R2 \times |df2 - dfr2| \quad (4)$$

$$D = R1 \times (df1 - dfr1)^2 + R2 \times |df2 - dfr2| \quad (5)$$

$$D = R1 \times |df1 - dfr1| + R2 \times (df2 - dfr2)^2 \quad (6)$$

Note that, in the equations (3) to (6), R1 and R2 represent weight coefficients.

The determination unit 54b determines whether the grasping state is hands-on or hands-off according to the index value D calculated by the index value calculation unit 54a.

For example, the determination unit 54b may determine that it is a hands-off state when the index value D is less than a threshold value, and may determine that it is a hands-on state when the index value D is equal to or more than the threshold value.

Alternatively, the determination unit 54b may use a counter that increases or decreases according to a comparison result between the index value D and the threshold value and compare a counter value with a predetermined value to determine the grasping state.

Figure 7A:
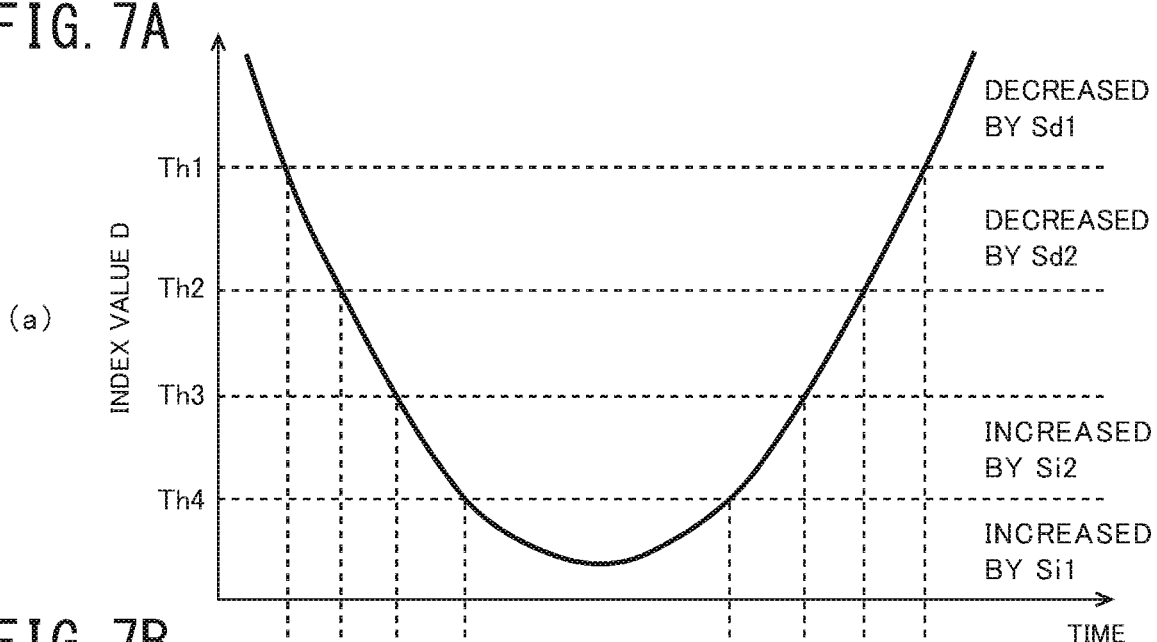
FIGS. 7A to 7C are time charts of one example of an index value D calculated from the frequency component of the angle difference, a count value CNT according to a result of a comparison between the index value D and threshold values Th1 to Th4, and a grasping state determination result signal HOD, respectively.

Hereinafter, one example of grasping state determination processing using a counter will be described with reference to FIGS. 7A to 7C. FIG. 7A is a time chart of one example of the index value D calculated by the index value calculation unit 54a, FIG. 7B is a time chart of a count value CNT that increases or decreases according to a result of a comparison between the index value D and threshold values Th1 to Th4, and FIG. 7C illustrates a result of the determination of the grasping state based on the counter value CNT.

Figure 7B:
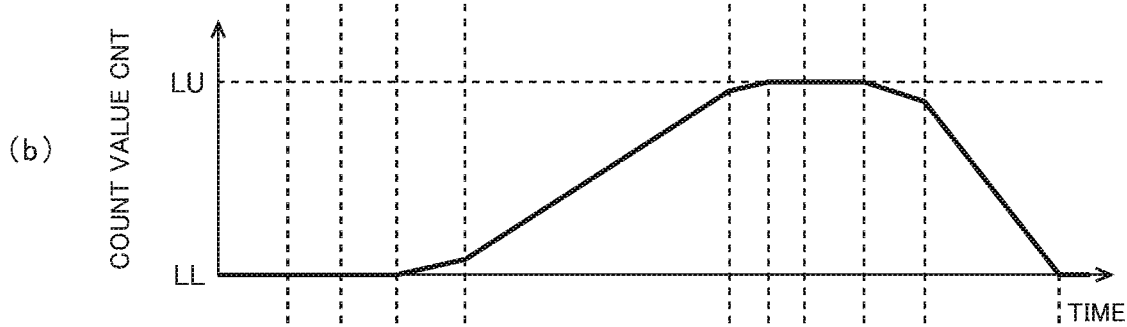
Figure 7C:
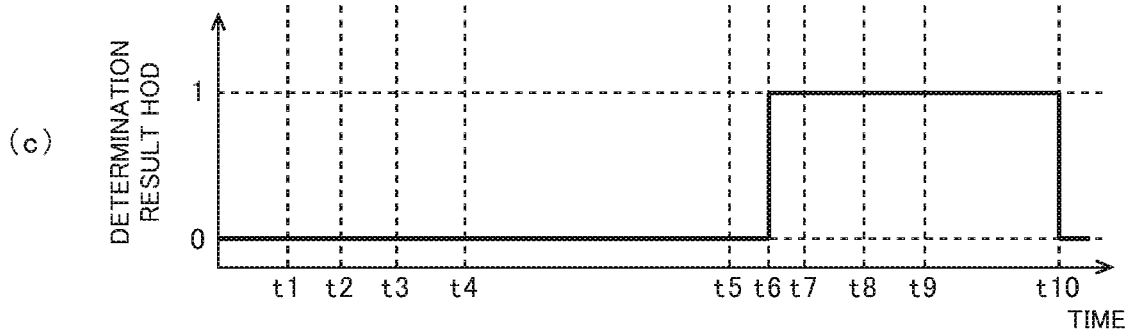

Reference will be made to FIGS. 7A and 7B. The determination unit 54b compares the index value D with the threshold values Th1, Th2, Th3, and Th4, and increases or decreases the count value CNT according to the result of the comparison. As illustrated in FIG. 7A, the threshold value Th1 is larger than the threshold value Th2, the threshold value Th2 is larger than the threshold value Th3, and the threshold value Th3 is larger than the threshold Th4.

When the index value D is equal to or more than the threshold value Th1, the determination unit 54b decreases the count value CNT by a step amount Sd1. Then, the determination unit 54b performs lower limit value limitation to the count value CNT. Specifically, when the decreased count value CNT is less than a lower limit value LL, the determination unit 54b maintains (limits) the count value CNT to the lower limit value LL.

Additionally, when the index value D is the threshold value Th2 or more and less than the threshold value Th1, the determination unit 54b decreases the count value CNT by a step amount Sd2. The step amount Sd2 is set smaller than the step amount Sd1. Then, lower limit value limitation is performed using the lower limit value LL.

Additionally, when the index value D is the threshold value Th3 or more and less than the threshold value Th2, the determination unit 54b does not increase or decrease the count value CNT.

When the index value D is the threshold value Th4 or more and less than the threshold value Th3, the determination unit 54b increases the count value CNT by a step amount Si2. Then, upper limit value limitation to the count value CNT is performed. Specifically, when the increased count value CNT is more than an upper limit value LU, the determination unit 54b maintains (limits) the count value CNT to the upper limit value LU.

Additionally, when the index value D is less than the threshold value Th4, the determination unit 54b increases the count value CNT by a step amount Si1. The step amount Si1 is set larger than the step amount Si2. Additionally, upper limit value limitation is performed using the upper limit value LU.

As a result, the count value CNT maintains the lower limit value LL in a period before time point t1 when the index value D is equal to or more than the threshold value Th1. Additionally, the count value CNT maintains the lower limit value LL even in a period (from time point t1 to time point t2) during which the index value D is the threshold value Th2 or more and less than the threshold value Th1 and a period (from time point t2 to time point t3) during which the index value D is the threshold value Th3 or more and less than the threshold value Th2.

When the index value D is less than the threshold value Th3 at time point t3, the determination unit 54b adds the step amount Si2 to the count value CNT at each control cycle. As a result, the count value CNT begins to increase.

When the index value D becomes less than the threshold value Th4 at time point t4, the determination unit 54b adds the step amount Si1 to the count value CNT at each control cycle.

Since the step amount Si1 is larger than the step amount Si2, the count value CNT increases at a faster rate in a period (from time point t4 to time point t5) during which the index value D is less than the threshold value Th4 than in a period (from time point t3 to time point t4) during which the index value D is the threshold value Th4 or more and less than the threshold value Th3.

The index value D turns from decrease to increase in the period of from time point t4 to time point t5, and becomes equal to or more than the threshold value Th4 at time point t5. Therefore, the determination unit 54b adds the step amount Si2 to the count value CNT at each control cycle.

At time point t6, the count value CNT reaches the upper limit value LU, so that the count value CNT stops to increase, and maintains the upper limit value LU. After that, even in a period (from time point t7 to time point t8) during which the index value D is the threshold value Th3 or more and less than the threshold value Th2, the count value CNT maintains the upper limit value LU.

When the index value D becomes equal to or more than the threshold value Th2 at time point t8, the determination unit 54b subtracts the step amount Sd2 from the count value CNT at each control cycle. As a result, the count value CNT begins to decrease.

When the index value D becomes equal to or more than the threshold value Th1 at time point t9, the determination unit 54b subtracts the step amount Sd1 from the count value CNT at each control cycle.

Since the step amount Sd1 is larger than the step amount Sd2, the count value CNT decreases at a faster rate in a period (from time point t9 to time point t10) during which the index value D is equal to or more than the threshold value Th1 than in a period (from time point t8 to time point t9) during which the index value D is the threshold value Th2 or more and less than the threshold value Th1.

The count value CNT reaches the lower limit value LL at time point t10, and thus the count value CNT stops to decrease, and maintains the lower limit value LL.

Reference will be made to FIG. 7C. The determination unit 54b generates and outputs a determination result signal HOD indicating a result of the determination of the grasping state according to a change in the count value CNT. The determination result signal HOD indicates a hands-on state at a value of "0", and indicates a hands-off state at a value of "1".

The determination result signal HOD has hysteresis characteristics. Thus, when the value of the determination result signal HOD is "0" and the count value CNT reaches the upper limit value LU from a value less than the upper limit value LU, the determination unit 54b switches the value of the determination result signal HOD from "0" to "1".

Additionally, when the value of the determination result signal HOD is "1" and the count value CNT reaches the lower limit value LL from a value more than the lower limit value LL, the determination unit 54b switches the value of the determination result signal HOD from "1" to "0".

Therefore, in the example of FIG. 7C, the determination unit 54b switches the value of the determination result signal HOD from "0" to "1" at time point t6 when the count value CNT reaches the upper limit value LU from a value less than the upper limit value LU. Additionally, at time point t10 when the count value CNT reaches the lower limit value LL from a value more than the lower limit value LL, the determination unit 54b switches the value of the determination result signal HOD from "1" to "0".

Note that the grasping state determination processing described with reference to FIGS. 7A to 7C is merely exemplification, and does not limit the present invention. For example, while the above exemplification has used the four threshold values Th1 to Th4, three or fewer threshold values or five or more threshold values may be used.

In addition, while the grasping state has been determined to be hands-off when the count value CNT has reached the upper limit value LU, it may be determined to be a hands-off state when the count value CNT reaches a predetermined value less than the upper limit value LU. Additionally, while the grasping state has been determined to be hands-on when the count value CNT has reached the lower limit value LL, it may be determined to be a hands-on state when the count value CNT reaches a predetermined value more than the lower limit value LL.

Furthermore, the direction of the increase or decrease of the count value CNT may be set to a direction opposite to that in the above description. In this case, when the count value CNT reaches the upper limit value LU, the grasping state may be determined to be hands-on, and when it reaches the lower limit value LL, it may be determined to be a hands-off state.

(Operation)

Figure 8:
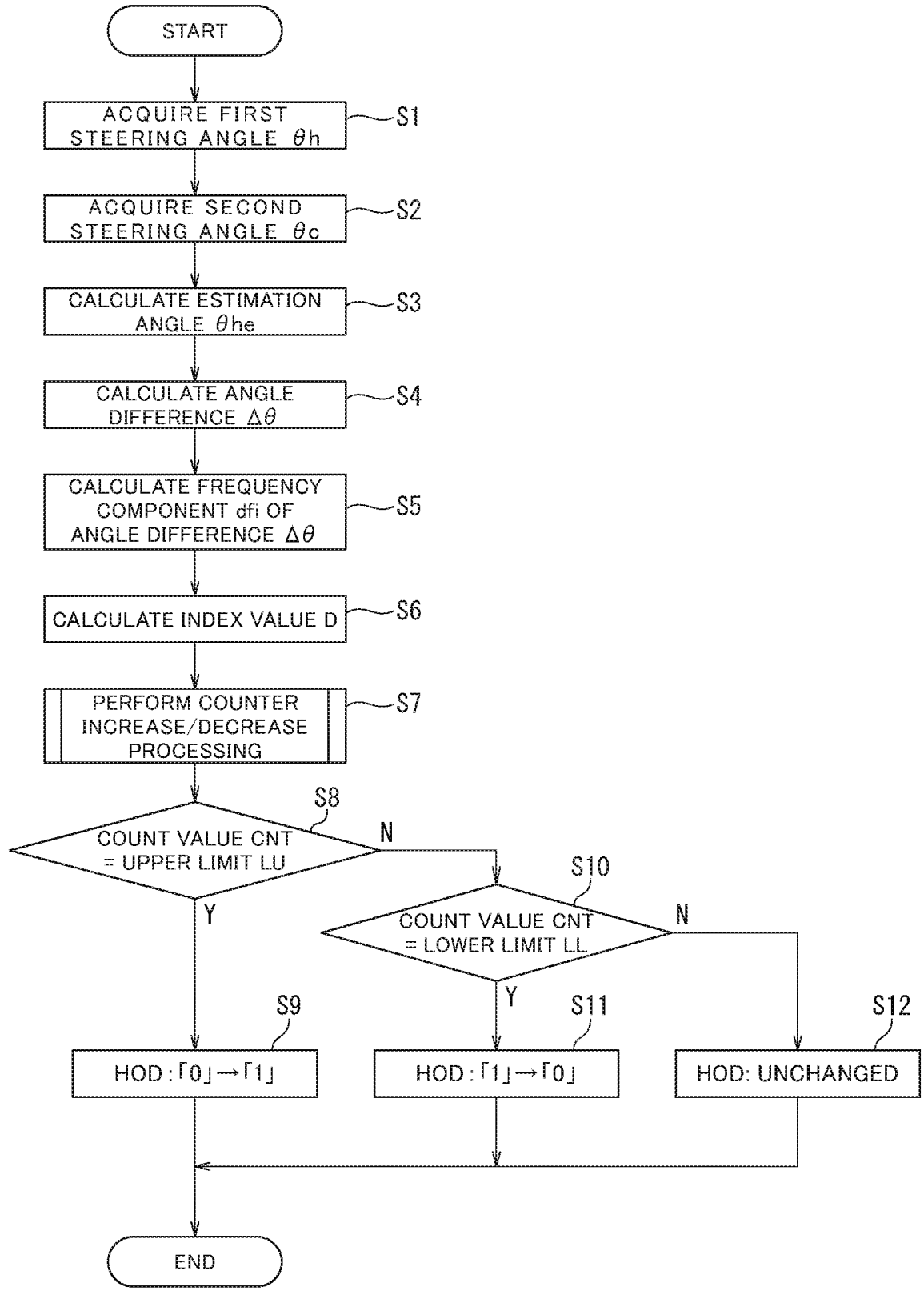
FIG. 8 is a flowchart of one example of a hands-off detection method of an embodiment.

FIG. 8 is a flowchart of one example of a hands-off detection method of an embodiment.

At step S1, the first steering angle sensor 10 detects the first steering angle θh of the input-side steering shaft 2a on the steering handle side of the steering shaft connected to the steering handle 1.

At step S2, the second steering angle sensor 11 detects the second steering angle θc of the output-side steering shaft 2b on the steered wheel side.

At step S3, the steering angle estimation unit 50 estimates the estimation angle θhe of the first steering angle θh on the steering handle side in a state where the steering handle 1 is not being grasped on the basis of the second steering angle θc on the steered wheel side detected by the second steering angle sensor 11.

At step S4, the subtractor 51 calculates, as the angle difference Δθ, the difference (θh−θhe) obtained by subtracting the estimation angle θhe from the first steering angle θh detected by the first steering angle sensor 10.

At step S5, the frequency analysis unit 52 performs frequency analysis of the angle difference Δθ calculated by the subtractor 51 to calculate the frequency component of the angle difference Δθ.

At step S6, the index value calculation unit 54a calculates the index value D based on the frequency component difference (dfi−dfri), which is the difference between the frequency component dfi and the reference frequency component dfri at each frequency fi (i=1, 2, . . . ).

At step S7, the determination unit 54b increases or decrease the count value CNT according to the result of the comparison between the index value D and the threshold values Th1 to Th4.

At step S8, the determination unit 54b determines whether the count value CNT has reached the upper limit value LU or not. When the count value CNT has reached the upper limit value LU (step S8: Y), processing proceeds to step S9. When the count value CNT is less than the upper limit value LU (step S8: N), processing proceeds to step S10.

At step S9, the determination unit 54b switches the value of the determination result signal HOD from "0" indicating the hands-on state to "1" indicating the hands-off state. After that, processing ends.

At step S10, the determination unit 54b determines whether the count value CNT has reached the lower limit value LL or not. When the count value CNT has reached the lower limit value LL (step S10: Y), processing proceeds to step S11. When the count value CNT is more than the lower limit value LL (step S10: N), processing proceeds to step S12.

At step S11, the determination unit 54b switches the value of the determination result signal HOD from "1" indicating the hands-off state to "0" indicating the hands-on state. After that, processing ends.

At step S12, the determination unit 54b maintains the value of the determination result signal HOD unchanged. After that, processing ends.

Second Embodiment

Next, the grasping state determination unit 54 of the second embodiment will be described. If the grasping state is determined on the basis of the index value D including only the term of the squared value $(dfi-dfri)^2$ or absolute value $|dfi-dfri|$ of the frequency component difference $(dfi-dfri)$ as in the first embodiment, the hands-off state may be falsely determined as the hands-on state in a case described below.

Reference will be made to FIG. 9. A dashed line schematically indicates the frequency component dfi of the angle difference Δθ in the hands-off state, and a solid line schematically indicates the reference frequency component dfri. Compared to FIG. 6B, as the output-side steering shaft 2b changes, an amplitude of the frequency component dfi increases.

In this way, when the amplitudes of each frequency component dfi (df1 and df2 in the example of FIG. 9) in the hands-off state both increase, the frequency component differences ((df1−dfr1) and (df2−dfr2) in the example of FIG. 9) increase, leading to increased index value D. This may result in a false determination that the grasping state is a hands-on state even though it is a hands-off state.

Thus, the index value calculation unit 54a of the second embodiment calculates each frequency component difference (dfi−dfri) at each of a plurality of frequencies fi (i=1, 2, . . . ). Then, the index value calculation unit 54a calculates the index value D that includes a weighted sum of the term of the squared value $(dfi-dfri)^2$ or absolute value $|dfi-dfri|$ of the frequency component difference at each of the frequencies fi (i=1, 2, . . . ) and the term of a product of the frequency component differences at the different frequencies.

For example, when calculating the index value D based on frequency component differences (df1−dfr1) and (df2−dfr2) at two frequencies f1 and f2, the index value calculation unit 54a may calculate the index value D on the basis of the following equations (7), (8), (9), or (10).

$$D=R1\times(df1-dfr1)^2+R12\times(df1-dfr1)(df2-dfr2)+R2\times(df2-dfr2)^2 \quad (7)$$

$$D=R1\times|df1-dfr1|+R12\times(df1-dfr1)(df2-dfr2)+R2\times|df2-dfr2| \quad (8)$$

$$D=R1\times(df1-dfr1)^2+R12\times(df1-dfr1)(df2-dfr2)+R2\times|df2-dfr2| \quad (9)$$

$$D=R1\times|df1-dfr1|+R12\times(df1-dfr1)(df2-dfr2)+R2\times(df2-dfr2)^2 \quad (10)$$

Note that, in equations (7) to (10), R1 and R2 represent weight coefficients attached to the term of the squared value $(dfi-dfri)^2$ or absolute value $|dfi-dfri|$ of the frequency component difference, and R12 represents a weight coefficient for the term of the product ((df1−dfr1) (df2−dfr2) in the example of equations (7) to (10)) of the frequency component differences at the different frequencies.

As illustrated in FIG. 9, when in the hands-off state, the frequency component differences at the different frequencies change in correlation with each other.

When the index value D is calculated on the basis of any of equations (7) to (10), a magnitude of the index value D (i.e., an absolute value |D| of the index value D) when the frequency components df1 and df2 change correlatively can be kept small by making the sign of the weight coefficient R12 different from the signs of the weight coefficients R1 and R2. Therefore, the determination of a hands-off state can be made.

On the other hand, when the correlation between the frequency components df1 and df2 changes significantly as in a hands-on state, the magnitude of the index value D increases, thus enabling the determination of a hands-on state.

For example, if the signs of the weight coefficients R1 and R2 are set to positive and the sign of the weight coefficient R12 is set to negative, the index value D is kept small when the frequency components df1 and df2 change correlatively, which can be determined to be a hands-off state. On the other hand, when, as in a hands-on state, the correlation between the frequency components df1 and df2 changes significantly, the index value D becomes large, which therefore can be determined to be a hands-on state.

Calculation examples of the index value D will be given below. Here, when the reference frequency components dfr1 and dfr2, respectively, are "1" and "5", a calculation result of equation (3) of the first embodiment is compared with a calculation result of equation (7) of the second embodiment.

$$D = R1 \times (df1-dfr1)^2 + R2 \times (df2-dfr2)^2 \qquad (3)$$

$$D = R1 \times (df1-dfr1)^2 + R12 \times (df1-dfr1)(df2-dfr2) + R2 \times (df2-dfr2)^2 \qquad (7)$$

The weight coefficients R1 and R2 are set to a positive coefficient "1", and the weight coefficient R12 is set to a negative coefficient "−5.2".

First, the index value D when the frequency components df1 and df2 change correlatively from the reference frequency components dfr1 and dfr2 in a hands-off state is calculated on the basis of each of equations (3) and (7).

Here, the calculations are made to obtain the index value D when the values of the frequency components df1 and df2 are "0.9" and "4.5", which are 0.9 times as much as the reference frequency components dfr1 and dfr2, and the index value D when the values thereof are "1.4" and "7", which are 1.4 times as much as that.

TABLE 1

|           |     |     | Equation (3) | Equation (7) |
|-----------|-----|-----|--------------|--------------|
| 0.9 times | df1 | 0.9 | 0.26         | 0.00         |
|           | df2 | 4.5 |              |              |
| 1.4 times | df1 | 1.4 | 0.16         | 0.00         |
|           | df2 | 7   |              |              |

Next, the index value D when, as in a hands-on state, the frequency components df1 and df2 change non-correlatively is calculated on the basis of each of equations (3) and (7). Here, the calculations are made to obtain the index value D when the frequency components df1 and df2, respectively, are "5" and "1".

TABLE 2

|                |     |   | Equation (3) | Equation (7) |
|----------------|-----|---|--------------|--------------|
| No correlation | df1 | 5 | 16.00        | 115.20       |
|                | df2 | 1 |              |              |

As can be seen from results of the above calculations, when, as in the hands-off state, the frequency components df1 and df2 change correlatively, the index value D based on equation (7) can be maintained at a smaller value than the index value D based on equation (3).

On the other hand, when, as in the hands-on state, the correlation between the frequency components df1 and df2 change significantly, the index value D based on equation (7) becomes larger than the index value D based on equation (3). Thus, the determination between the hands-off state and the hands-on state can be made with higher accuracy.

Note that the index value calculation unit 54a of the second embodiment may use a matrix arithmetic expression given in the following equation (11) to calculate the index value D.

$$D = \Delta Df^T \cdot R \cdot \Delta Df \qquad (11)$$

In equation (11), $\Delta Df$ represents an Nth-order column vector including frequency component differences (dfi−dfri) at a plurality (N pieces) of frequencies, and R represents a weight coefficient matrix (Nth-order square matrix). Additionally, $\Delta Df^T$ is an Nth-order row vector.

For example, when calculating the index value D based on the frequency component differences (df1−dfr1) and (df2−dfr2) at the two frequencies f1 and f2, the index value D may be calculated on the basis of a matrix operation expression of the following equation (12).

[Math. 1]

$$D = (df1 - dfr1 \quad df2 - dfr2) \begin{pmatrix} R1 & \dfrac{R12}{2} \\ \dfrac{R12}{2} & R2 \end{pmatrix} \begin{pmatrix} df1 - dfr1 \\ df2 - dfr2 \end{pmatrix} \qquad (12)$$

In addition, for example, when calculating the index value D based on frequency component differences (df1−dfr1), (df2−dfr2), and (df3−dfr3) at three frequencies f1, f2, and f3, the index value D may be calculated on the basis of a matrix operation expression of the following equation (13).

[Math. 2]

$$D = (df1 - dfr1 \quad df2 - dfr2 \quad df3 - dfr3) \begin{pmatrix} R1 & \dfrac{R12}{2} & \dfrac{R13}{2} \\ \dfrac{R12}{2} & R2 & \dfrac{R23}{2} \\ \dfrac{R13}{2} & \dfrac{R23}{2} & R3 \end{pmatrix} \begin{pmatrix} dr1 - dfr1 \\ df2 - dfr2 \\ df3 - dfr3 \end{pmatrix} \qquad (13)$$

As indicated in the above equation (12) or (13), diagonal components of the weight coefficient matrix (Nth-order square matrix) are weight coefficients that are multiplied by the squared value $(dfi-dfri)^2$ of the frequency component difference. Additionally, components other than the diagonal components of the weight coefficient matrix (Nth-order square matrix) are weight coefficients that are multiplied by a product of different frequency component differences. Signs of the components other than the diagonal components are different from signs of the diagonal components. Specifically, the signs of the diagonal components are set to positive, whereas the sings of the components other than the diagonal components are set to negative. This allows the magnitude of the index value D (i.e., the absolute value |D| of the index value D) when the frequency components dfi change correlatively to be kept small. Therefore, the hands-off state can be determined accurately.

Effects of Embodiments (1) The first steering angle sensor 10 acquires the first steering angle θh, which is the steering angle of the steering handle 1. The second steering angle sensor 11 acquires the second steering angle θc, which is the steering angle of the steering mechanism connected to the steering handle 1 via the torsion bar 3. The steering angle estimation unit 50 obtains the estimation angle θhe of the first steering angle θh on the basis of response characteristics of the first steering angle θh with respect to the second steering angle θc in the state where the steering handle 1 is not being grasped and the second steering angle θc acquired by the second steering angle sensor 11.

The subtractor 51 calculates the angle difference Δθ between the first steering angle θh acquired by the first steering angle sensor 10 and the estimation angle θhe. The frequency analysis unit 52 calculates the frequency component dfi (i=1, 2, . . . ) of the angle difference Δθ. The reference value storage unit 53 stores the reference frequency component dfri (i=1, 2, . . . ) which is the frequency component of the angle difference Δθ in the state where the steering handle 1 is not being grasped.

The grasping state determination unit 54 determines whether the grasping state of the steering handle 1 is a hands-on state or a hands-off state on the basis of the frequency component dfi calculated by the frequency analysis unit 52 and the reference frequency component dfri.

This allows the grasping state to be determined using the difference in the frequency characteristics of the angle difference Δθ between the hands-off state and the hands-on state. As a result, accuracy in the determination of the grasping state can be improved.

Particularly, determining the grasping state on the basis of frequency components dfi and reference frequency components dfri at a plurality of frequencies fi (i=1, 2, . . . ) can further improve accuracy in the determination of the grasping state.

(2) The grasping state determination unit 54 may include the index value calculation unit 54*a* that calculates the index value D based on the frequency component difference (dfi–dfri) being the difference between the frequency component dfi calculated by the frequency analysis unit 52 and the reference frequency component dfri and the determination unit 54*b* that determines the grasping state according to the index value D.

This allows the grasping state of the steering handle 1 to be determined on the basis of the frequency component dfi and the reference frequency component dfri.

(3) The index value calculation unit 54*a* may calculate the index value D on the basis of the squared value (dfi–dfri)² or absolute value |dfi–dfri| of the frequency component difference (dfi–dfri).

This allows the grasping state of the steering handle 1 to be determined on the basis of the magnitude of the frequency component difference (dfi–dfri).

(4) The index value calculation unit 54*a* may calculate the first frequency component difference (df1–dfr1) and the second frequency component difference (df2–dfr2), respectively, which are frequency component differences at the first frequency f1 and the second frequency f2, respectively, and may calculate the index value D that includes a weighted sum of a first term being a squared value (df1–dfr1)² or absolute value |df1–dfr1| of the first frequency component difference, a second term being a squared value (df2–dfr2)² or absolute value |df2–dfr2| of the second frequency component difference, and a third term being a product (df1–dfr1)(df2–dfr2) of the first frequency component difference and the second frequency component difference.

This allows the correlation between the frequency component df1 and the frequency component df2 to be reflected in the index value D even when the magnitudes of the frequency component differences (df1–dfr1) and (df2–dfr2) increase as the frequency components df1 and df2 at the different frequencies f1 and f2 change correlatively in the hands-off state. Thus, the loss of determination accuracy can be reduced.

(5) The signs of the weight coefficients for the first and second terms may be different from the sign of the weight coefficient for the third term.

This can reduce an increase in the index value D, and thus can reduce the loss of the determination accuracy even when the magnitudes of the frequency component differences (df1–dfr1) and (df2–dfr2) increase as the frequency components df1 and df2 at the different frequencies f1 and f2 change correlatively in the hands-off state.

(6) The determination unit 54*b* may increase or decrease the count value CNT according to the result of the comparison between the index value D and the threshold values Th1 to Th4 and compare the count value CNT with the predetermined values LU and LL to determine the grasping state. This allows the grasping state to be determined on the basis of the index value D calculated over a plurality of times, thus enabling improved determination accuracy.

REFERENCE SIGNS LIST

1: Steering handle (steering wheel)
2*a*: Input-side steering shaft
2*b*: Output-side steering shaft
3: Torsion bar
4: Reduction gear (worm gear)
5*a*, 5*b*: Universal joint
6: Pinion rack mechanism
6*a*: Pinion
6*b*: Rack
7*a*, 7*b*: Tie rod
8*a*, 8*b*: Hub unit
9L, 9R: Steered wheel
10: First steering angle sensor
11: Second steering angle sensor
12: Torque sensor
13: Vehicle speed sensor
14: Key
15: Battery
20: Motor
21: Rotation angle sensor
30: Controller
41: Current command value calculation unit
42A, 44-4, 44-5, 57: Adder
42B, 51: Subtractor
43: Current limitation unit
44: Compensation signal generation unit
44-1: Convergence
44-2: Inertia
44-3: Self-aligning torque
45: PI (proportional-integral) control unit
46: PWM control unit
47: Inverter
48: Motor current detector
50: Steering angle estimation unit
52: Frequency analysis unit
53: Reference value storage unit
54: Grasping state determination unit
54*a*: Index value calculation unit
54*b*: Determination unit
55: Conversion unit
56: Torsion angle calculation unit

The invention claimed is:

1. A steering device including a hands-off detection device comprising:
a first steering angle sensor configured to acquire a first steering angle being a steering angle of a steering wheel;
a second steering angle sensor configured to acquire a second steering angle being a steering angle of a steering mechanism connected to the steering wheel via a torsion bar; and
an electronic controller including a processor, the electronic controller configured to:
obtain an estimation angle of the first steering angle in a state where the steering wheel is not being grasped on a basis of the second steering angle;
calculate an angle difference between the first steering angle and the estimation angle;
calculate a frequency component of the angle difference;
store a reference frequency component being the frequency component of the angle difference in the state where the steering wheel is not being grasped; and
determine a grasping state of the steering wheel on a basis of the frequency component and the reference frequency component,
wherein the electronic controller is further configured to calculate an index value based on a frequency component difference being a difference between the frequency component and the reference frequency component and to determine the grasping state according to the index value,
wherein the electronic controller is further configured to calculate each of a first frequency component difference and a second frequency component difference being the frequency component difference at each of a first frequency and a second frequency, and to calculate the index value including a weighted sum of a first term being a squared value or absolute value of the first frequency component difference, a second term being a squared value or absolute value of the second frequency component difference, and a third term being a product of the first frequency component difference and the second frequency component difference, and
wherein the steering device applies steering force to the steering mechanism according to a result of the determination of the grasping state of the steering wheel by the hands-off detection device.

2. The steering device according to claim 1, wherein the electronic controller is further configured to calculate the index value on a basis of a squared value or absolute value of the frequency component difference.

3. The steering device according to claim 1, wherein signs of weight coefficients for the first term and the second term are different from a sign of a weight coefficient for the third term.

4. A steering device including a hands-off detection device comprising:
a first steering angle sensor configured to acquire a first steering angle being a steering angle of a steering wheel;
a second steering angle sensor configured to acquire a second steering angle being a steering angle of a steering mechanism connected to the steering wheel via a torsion bar; and
an electronic controller including a processor, the electronic controller configured to:
obtain an estimation angle of the first steering angle in a state where the steering wheel is not being grasped on a basis of the second steering angle;
calculate an angle difference between the first steering angle and the estimation angle;
calculate a frequency component of the angle difference;
store a reference frequency component being the frequency component of the angle difference in the state where the steering wheel is not being grasped; and
determine a grasping state of the steering wheel on a basis of the frequency component and the reference frequency component,
wherein the electronic controller is further configured to calculate an index value based on a frequency component difference being a difference between the frequency component and the reference frequency component and to determine the grasping state according to the index value,
wherein N is a natural number equal to or more than 2, and the electronic controller is further configured to set an Nth-order row vector and an Nth-order column vector including the frequency component difference at each of N frequencies as components, and to calculate a matrix product of the Nth-order row vector, a weight coefficient matrix being an Nth-order square matrix, and the Nth-order column vector to calculate the index value, and
wherein the steering device applies steering force to the steering mechanism according to a result of the determination of the grasping state of the steering wheel by the hands-off detection device.

5. The steering device according to claim 4, wherein signs of diagonal components of the weight coefficient matrix are different from signs of components other than the diagonal components of the weight coefficient matrix.

6. The steering device according to claim 1, wherein the electronic controller is further configured to increase or decrease a counter according to a result of a comparison between the index value and a threshold value, and to compare a value of the counter with a predetermined value to determine the grasping state.

* * * * *